(12) United States Patent
Hardy et al.

(10) Patent No.: US 9,403,117 B2
(45) Date of Patent: Aug. 2, 2016

(54) PORTABLE PURGE SYSTEM

(71) Applicants: Kevin Richard Hardy, San Diego, CA (US); Jonas Dean Cochran, San Diego, CA (US)

(72) Inventors: Kevin Richard Hardy, San Diego, CA (US); Jonas Dean Cochran, San Diego, CA (US)

(*) Notice: Subject to any disclaimer, the term of this patent is extended or adjusted under 35 U.S.C. 154(b) by 0 days.

(21) Appl. No.: 14/171,502

(22) Filed: Feb. 3, 2014

(65) Prior Publication Data
US 2015/0231552 A1    Aug. 20, 2015

Related U.S. Application Data

(60) Provisional application No. 61/761,819, filed on Feb. 7, 2013.

(51) Int. Cl.
*B01D 53/02* (2006.01)
*B01D 53/04* (2006.01)
*B01D 53/26* (2006.01)

(52) U.S. Cl.
CPC ........ *B01D 53/0454* (2013.01); *B01D 53/0423* (2013.01); *B01D 53/263* (2013.01); *B01D 2259/455* (2013.01); *B01D 2259/4525* (2013.01); *B01D 2259/4566* (2013.01); *B01D 2259/4575* (2013.01)

(58) Field of Classification Search
CPC .......... B01D 2257/80; B01D 53/0423; B01D 53/0454
See application file for complete search history.

(56) References Cited

U.S. PATENT DOCUMENTS

| | | |
|---|---|---|
| 5,433,574 A | 7/1995 | Kawano et al. |
| 2008/0003111 A1* | 1/2008 | Turan ................... F04B 27/06 417/234 |
| 2008/0099348 A1 | 5/2008 | Naylor |
| 2012/0309286 A1 | 12/2012 | Nakano |
| 2013/0145819 A1* | 6/2013 | Odell ..................... C01B 3/00 73/23.2 |
| 2013/0189595 A1 | 7/2013 | Izuhara et al. |

* cited by examiner

*Primary Examiner* — Christopher P Jones
(74) *Attorney, Agent, or Firm* — Mark Wisnosky (57) ABSTRACT

A purge system and methods are described. The system allows purging of closed vessels in a precise and reproducible manner under microprocessor and sensor control. The process includes automated valves that allow repeated purge cycles with little or no operator attention. The purge parameters may be stored in memory for recall at a later time to repeat the purge process on the same or a different vessel. In a preferred embodiment the equipment and process allows for purging and desiccation of deep-sea vehicles without the need to carry compressed gas cylinders out to sea.

13 Claims, 6 Drawing Sheets

PORTABLE PURGE SYSTEM

CROSS-REFERENCE TO RELATED APPLICATIONS

This application claims priority to U.S. Provisional application 61/761,819 filed on 7 Feb. 2013, titled Portable Desiccation System by the same inventors.

BACKGROUND OF THE INVENTION

1. Technical Field

The present invention relates to a portable system to purge and dry the environment within a sealed Vessel.

2. Related Background Art

Vessels that operate in harsh environments such as space, under the sea and in extreme heat or cold environments frequently are sealed against these environments to protect equipment and content of the vessel. In many cases where a vehicle operates in cold environment it is important to control the internal moisture of the vessel to avoid condensation and/or freezing on the vessel walls and on equipment surfaces within the vessel. One example of such vessels includes free vessels used to carry equipment to the ocean floor and back. In one example these vessels are made of glass spheres to allow photograph and other observations to be made through the walls of the vessel. It is therefore important that the walls of the vessel and the photographic equipment are kept free of condensation. Frequently the equipment is setup and deployed while the user is in or around the harsh environments. They are frequently in cramped quarters and do not have access to the equipment typically used for purge and desiccation of vessels that is available on land in a laboratory or factory.

Dry nitrogen gas is frequently used to prepare a vessel for deployment by sweeping the interior with a flow of dry nitrogen from a cylinder. In the marine or space environment however the supply of dry nitrogen is limited or non-existent. Compressed nitrogen tanks that have sufficient capacity to purge a vessel are typically too large to fit in cramped quarters where a vessel is to be deployed in the field. Lack of sufficient supply can render experiments useless. Cylinders are almost always re-filled at a land-based station. Once the supply of nitrogen in a cylinder is exhausted no more purging can be accomplished.

Frequently the goal of a purge process is to remove moisture from the air within a vessel to a pre-selected humidity level. The pre-selected level may be on the basis of the dew point at the operating temperature of the vessel or on the basis of other factors. Some vessels may require an air environment with a controlled amount of humidity. Such an environment cannot be accomplished using dry compressed nitrogen. It some cases dry compressed air is used for purging but this again has the limits of a supply tank capacity. In some cases the equipment within the vessel cannot withstand reduced or elevated air pressure or at least has an operating range for air pressure. There is a need for a purge system that controls the air pressure within the vessel during the purge process.

In other cases the purge is done to a setting to detect other chemicals within the vessel environment. There are currently known general-purpose purge devices that can take a variety of input sensors and programmatically purge a connected vessel to attain a pre-selected constituent level. In some cases the chemical constituent is the oxygen level within the vessel, in others in is the level of a harmful or flammable constituent.

There is a need for a compact, portable, lightweight, controllable and renewable portable purge system. There is a need for a system that can automatically purge a vessel to a controlled humidity level while maintaining the air pressure within the vessel to a pre-selected range. There is a need for a system that is compact and renewable. There is a need for a system that does not require bulky and heavy compressed gas tanks.

DISCLOSURE OF THE INVENTION

A portable purge system is described that addresses the deficiencies of the current art systems described above. A portable purge system is described. The system makes use of a vacuum pump, special fittings, a drying or other conditioning system and a controller to purge a vessel. The system is small enough to be easily taken aboard a ship or space vehicle and does not require access to dry compressed gas. The system can be programmed to automatically purge a closed vessel to a pre-selected humidity level. One embodiment includes special fittings used with the system. Another embodiment includes the control system for the portable purge system. Another embodiment includes reading a sensor that is indicative of the chemical composition of the atmosphere within a vessel and purging the vessel through a series of evacuation and purge cycles until a chemical constituent reaches a pre-selected level. In one embodiment the constituent is water vapor and purging is done to a pre-selected vapor level. In one embodiment the pre-selected level of water is based upon a target dew point for operation of the vessel. In another embodiment a sensor detects a toxic or other wise harmful gas and a purge cycle is run to a pre-selected level of the gas constituent. Non-limiting examples would be detecting carbon monoxide, carbon dioxide, nitrogen, or oxygen (or the lack thereof) and purging the vessel to reach a pre-selected level of the constituent. In another embodiment the sensor detects flammable or explosive components and a purge cycle is run to reduce flammable or explosive components to a pre-selected level.

MODES FOR CARRYING OUT THE INVENTION

Figure 1:
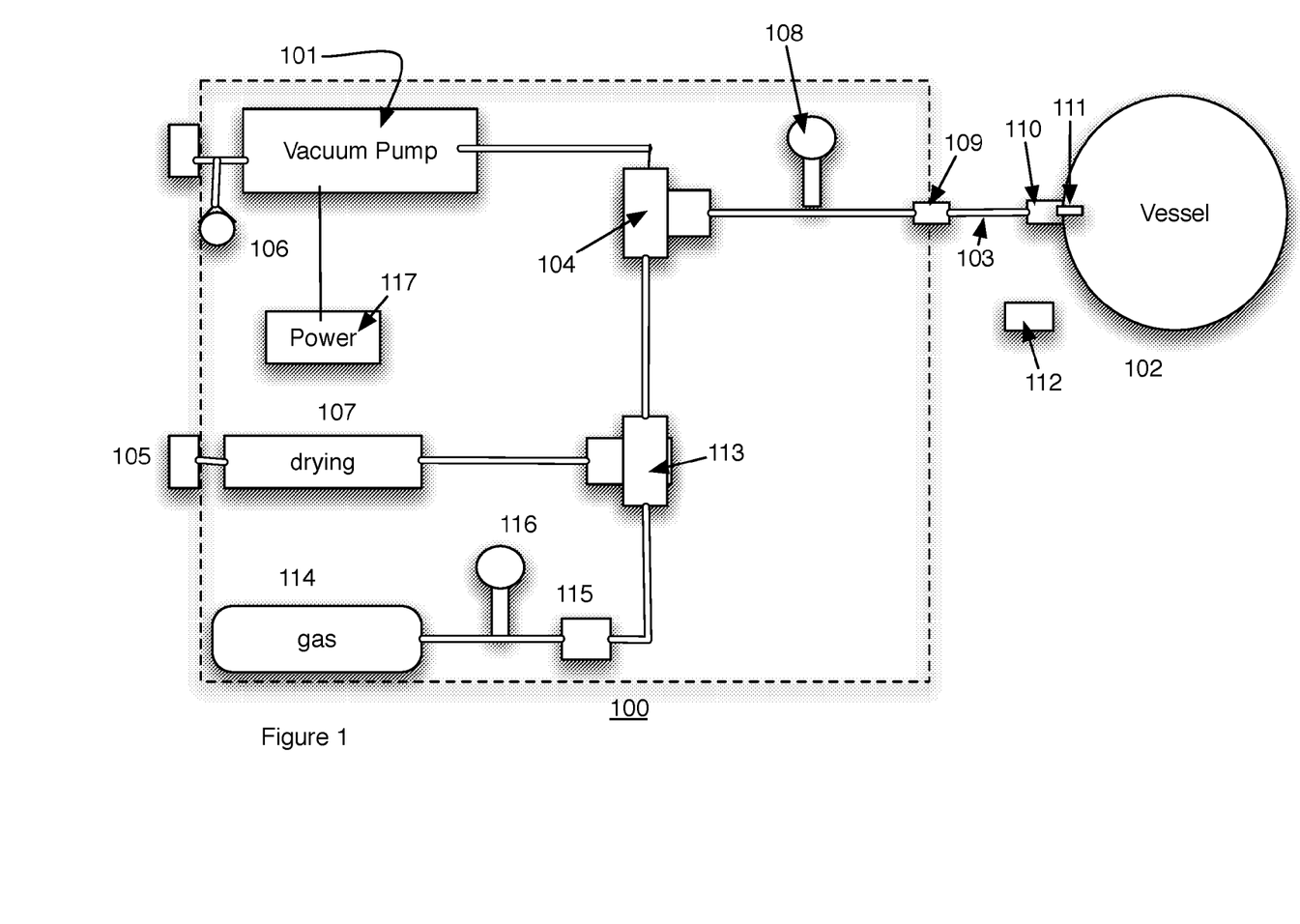
FIG. 1 is a block diagram showing a system for practicing the invention.

Referring to FIG. 1 one embodiment of a purge system 100 is comprised of a vacuum pump 101 that is connected by a manifold 103 to the other components and to a sealed vessel 102 that is to be purged. The embodiment further includes a three-way valve 104 that connects the vessel to the vacuum pump or to an inlet 105. In one embodiment the inlet 105 includes a desiccant 107 such that air flowing into the inlet is dried before entering the vessel 102. The system further includes a vacuum gauge 108 and an inlet port 109. In the preferred embodiment the fitting 110 includes a purge fitting 111 that is attached to the vessel 102 and that when detached from the purge system 100 can be capped (not shown) to withstand the high pressures of the depths of the ocean. In the preferred embodiment the purge fitting 111 when capped can maintain a sealed environment within the vessel with at least 20,000 PSI external pressure. Another embodiment further includes a gas source 114 and a pressure controller 115 connected to the vessel through a control valve 113 such that the vessel can be cyclically evacuated to a pre-selected level indicated by the vacuum gauge 108 and the pressurized with gas from the supply 107 to a pre-selected level as indicated by the pressure gauge 116. In another embodiment the system includes a plurality of gas sources 114, valves 115 and pressure indicators 116 such that the environment in the vessel 102 can be customized with a mixture of gases. The combination of vacuum pump, connectors and gas sources allows the atmosphere within the vessel to be tailored to a preselected composition without the need for fully evacuating the vessel by repeated cycles of partial evacuation and purge. In this manner. Vessels, fittings and components that cannot withstand extremes of high or low pressures can still be located within the vessel during a purge process to adjust the composition of the atmosphere within the vessel.

Figure 2:
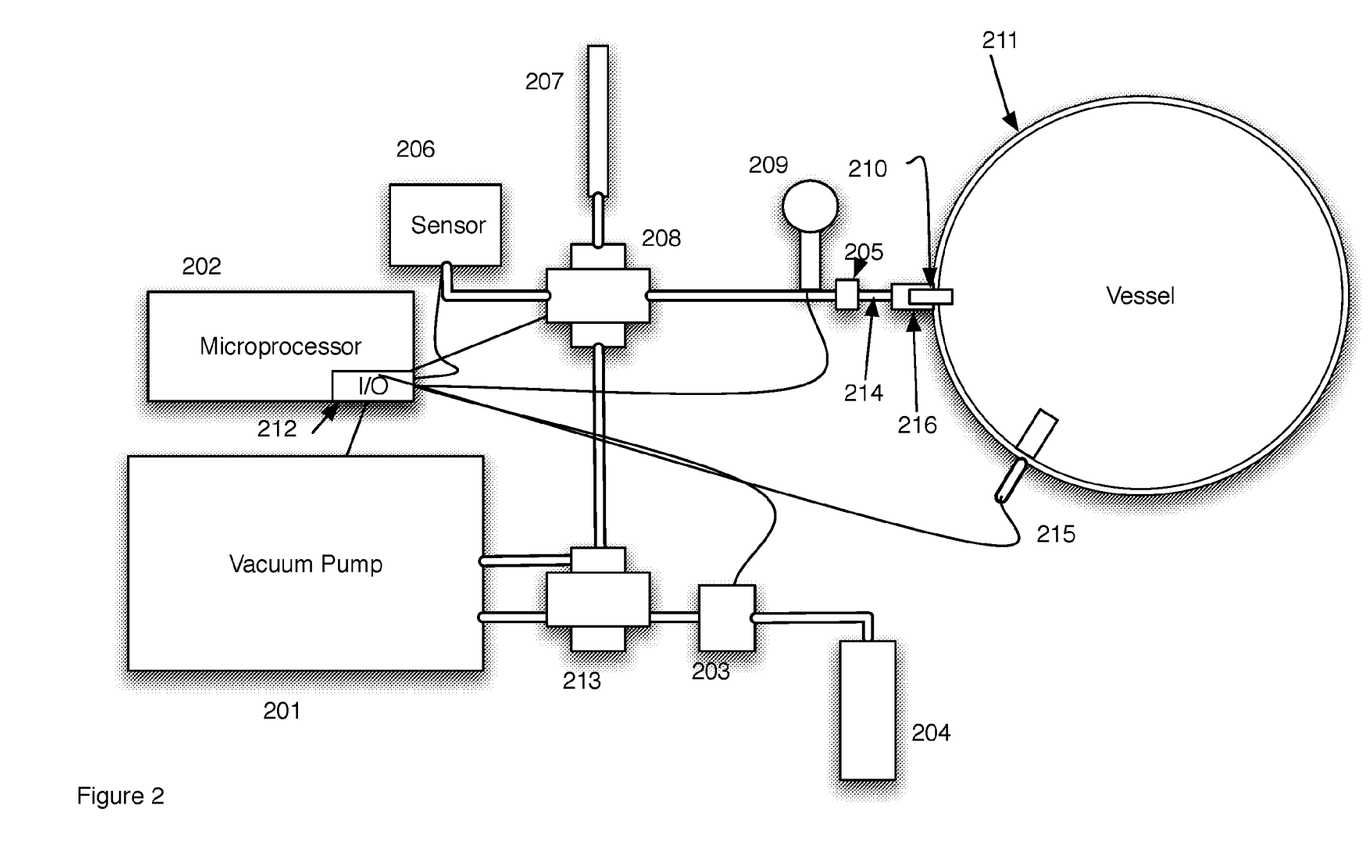
FIG. 2 is a block diagram for an automated purge system.

Automation components in an embodiment of the purge system are shown in FIG. 2. The automated components are used when the purge fitting 216 is connected to the vessel fitting 210. A vacuum pump 201 is connected to the input/output port 212 of a microprocessor 202. The microprocessor is comprised of a computer processor, memory, an I/O port and a user interface to input parameters and programs. The microprocessor includes a timing clock such that a sequence of events may be programmed to actuate valves, pumps, heaters, chillers and sensors. The microprocessor can be programmed to control the vacuum pump 201 by turning it on and off and also controlling the speed at which the pump operates. The I/O port 212 further includes analog to digital (A/D) converters such that the output of analog sensors may be read and the microprocessor can be programmed to take actions at pre-selected values from the sensors. Exemplary sensors include humidity measurement devices 204, temperature sensors and chemical composition sensors 215. The automated system further includes electronically actuated valves 208, 213 also connected to the I/O port of the microprocessor. Similarly, sensors for pressure 203, 209, and composition 206 are also connected to the I/O port of the microprocessor. The automated version also includes switch 205 that is pre-set to be actuated at a particular pressure within the vessel 211. In practice each of the valves 208, 213 can be operated independently based upon a program input into the memory of the microprocessor.

Figure 3:
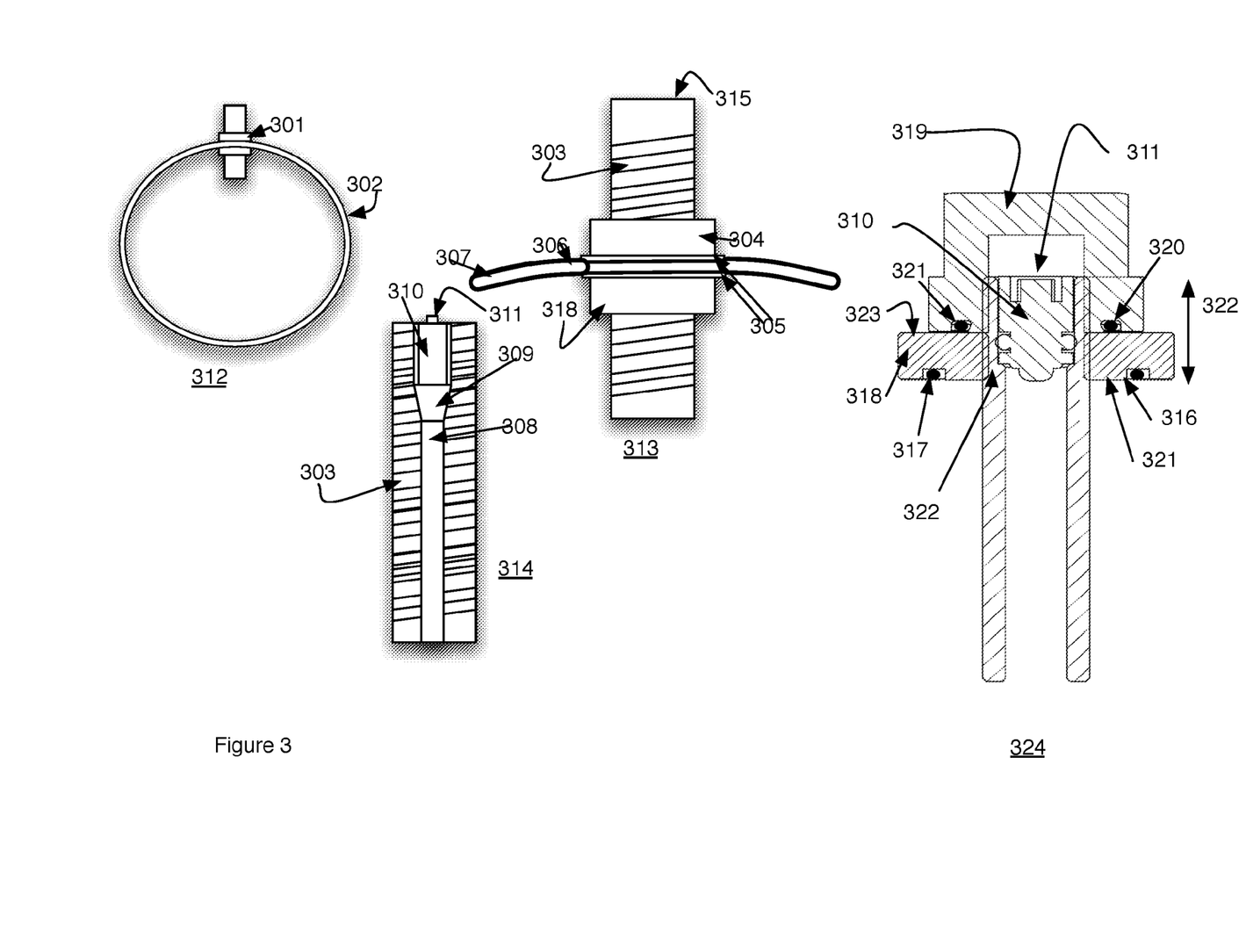
FIG. 3 includes diagrams of a purge port embodiment of the system.

Referring now to FIG. 3 the purge port embodiment of the invention is described. The purge port allows access across the wall of a vessel for purging. In one embodiment the vessel is a sphere and access across the wall of a sphere requires special adaptations to provide an airtight seal. The purge port 301 is attached through the wall of the vessel 302. FIG. 3 shows four views of the purge port. The first 312 is an overall cross-section view of the purge port and vessel. The second view 313 is a close up view of the purge port and a section of the vessel wall. The third view 314 is a cross-section view of the purge port. The fourth 316 shows a cross-sectional view of another embodiment. The purge port assembly includes a threaded rod 303 that has hollow core 308. The hollow core includes a tapered region 309 that supports a valve 310 pressing on the release 311 of the valve opens the purge port for passage of air top to bottom. The purge port is inserted through a hole (not shown) in the wall 307 of the vessel. The wall of the vessel is ground flat in a region 306 adjoining the hole to allow an airtight fit to the purge port. The purge port is sealed to the wall by use of a pair of threaded nuts 304 one on either side of the wall of the vessel 307. A pair of compressible washers 305 are included immediately adjacent to the wall of the sphere and are compressed against the wall of the sphere upon tightening the nuts 304. Referring to the fourth view 316, another embodiment is shown. The purge port is comprised of a rod that in one embodiment is a threaded rod an din another embodiment only the top portion 322 is threaded to fit the ring 318 and the cap 320. The bottom surface 321 of the ring fits against the outer wall of the vessel (not shown). The port is sealed to the outer wall using o-rings embedded in grooves 319 cut into the bottom surface 321 of the ring. The embodiment further includes a cap 320 that is removably screwed onto the top end of the shaft 317 and seals against the top surface 323 of the ring using o-rings embedded in grooves 321. In one embodiment there is no lower ring (analogous to the lower ring 304 shown in the third view 313) to clamp the purge port to the vessel surface from the inside. This embodiment would be suitable for use where the vessel is held at a lower pressure than the outside atmosphere and the outside air or water pressure would secure the purge port against the outer vessel surface. In another embodiment the rod 317 is threaded beyond the region 322 and a lower ring is included to clamp the purge port in position from the inside of the vessel. In another embodiment the wall of the vessel includes a threaded hole sized to fit the threaded shaft of the purge port and the purge port is screwed into the hole and thereby secured to the surface of the vessel.

Figure 4:
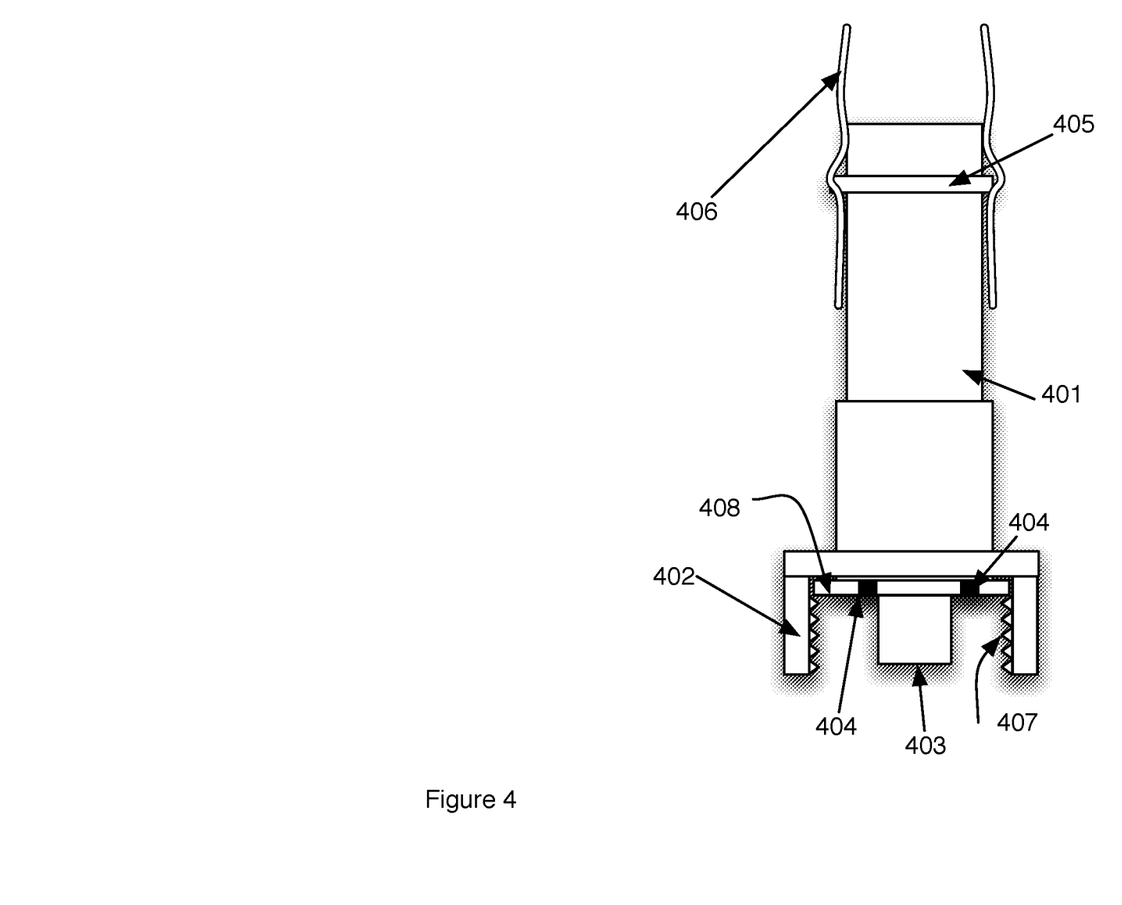
FIG. 4 is a diagram of an attachment to the purge port

The purge port assembly works in conjunction with the fitting shown in FIG. 4. The fitting of FIG. 4 attaches and seals to the top 315 of the purge port. The fitting includes a hollow core tube 401 with a flat 408 on one end that seals against the top 315 of the purge port. The flat includes a pair of holes 404 to allow passage of air through the hollow inside of the purge port and to the vessel interior. The fitting includes a projection 403 that fits against the release 311 on the valve 310 and opens the valve in the purge port once the fitting is screwed onto the purge port body. The fitting is screwed to the purge port through use of a knurled know 402 that includes threads 407 on the interior wall that match the threads on the purge port body. The fitting is connected to the pump and other manifold parts shown in FIGS. 1 and 2 through use of tubing 406 that forms an airtight seal to the top of the fitting 401. The tubing is made of any suitable material including rubber, plastic, glass and metal. With sealing to the fitting by means well known in the art. In a preferred embodiment the fitting includes a raised region 405 to which a plastic or rubber hose 406 may be clamped to form a seal.

Figure 5:
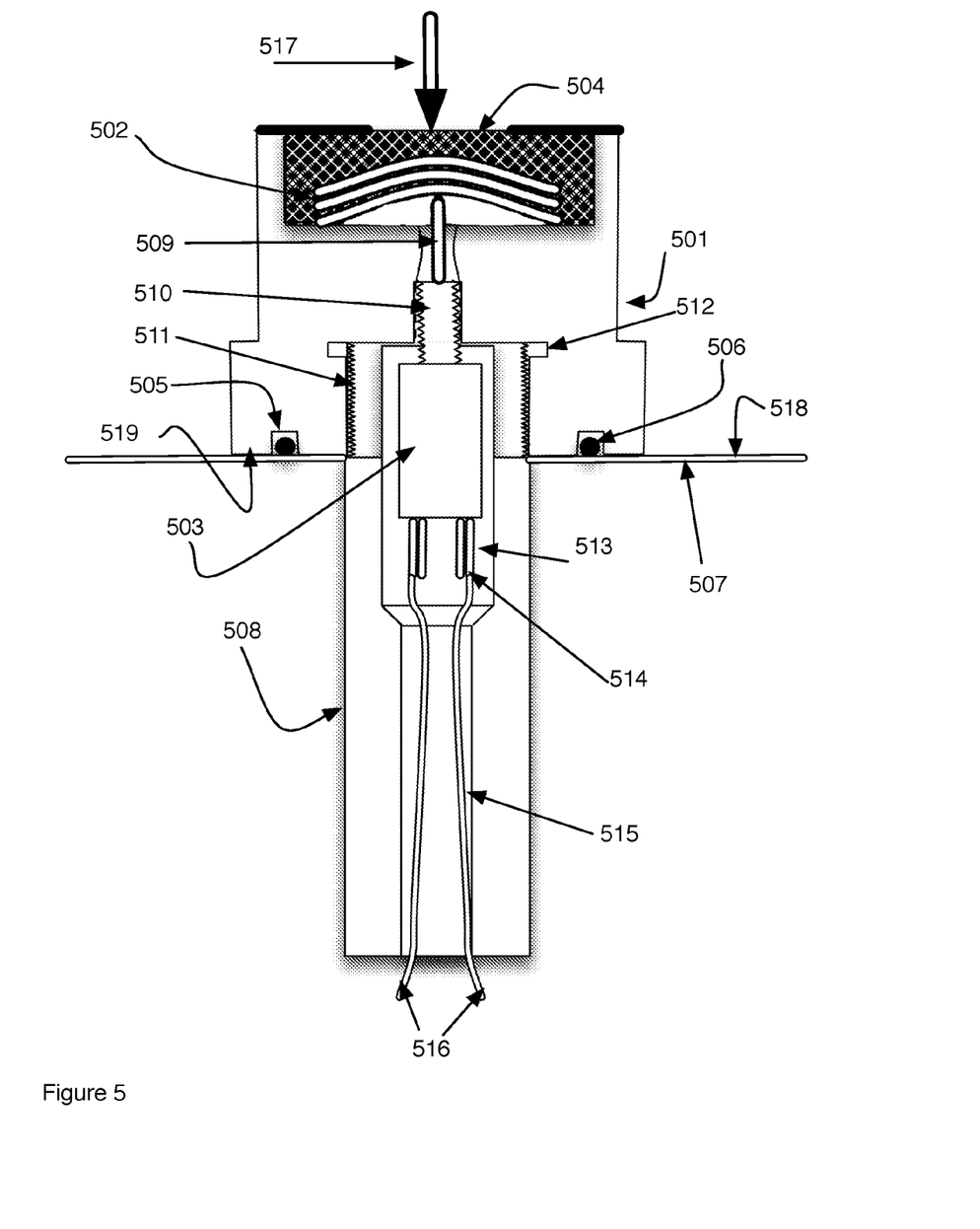
FIG. 5 is a diagram of a pressure activated switch embodiment of the invention.

Referring now to FIG. 5, details of the pressure switch component of the purge system are shown. A cross-sectional view of the pressure switch component is shown. The pressure switch is comprised of a housing 501 and within the housing is an electrical switch 503 that is actuated by a push rod 509. The push rod is fit within a threaded collar 510. The push rod is in contact with flexible domes 502. In the preferred embodiment the domes are equivalent to those metal domes manufactured by Snaptron Inc, of Windsor Colo., USA. The domes are encapsulated in a polymeric material 505. Pressure 517 on the surface 504 of the polymeric material causes the flexible domes 502 to flex and actuate the push rod 509 that in turn activates the switch 503. When the pressure within the vessel exceeds a pre-selected value the domes press against the push rod and activate the switch. Conversely when the pressure is reduced on the interior of the vessel the domes move away from the push rod and the switch is placed in the alternate state. The pressure at which the switch is activated is selected by variation in the stiffness and quantity of the domes 502 and the modulus of the encapsulant material 504. Non-limiting examples of encapsulant material include silicone, polyurethane, polyalkenes, such as polypropylene and polyethylene, polystyrene, polyurethanes, rubber, and other polymeric materials both filled and unfilled. The threaded collar 510 screws into the body of the housing 501 thus positioning the pushrod 509 in contact with the domes 502. The housing further includes a second threaded region 511, 512 that mates with a second housing 508. The second housing positioned against the wall 507 of the vessel such that when the second housing 508 is screwed into the threaded region 511 of the first housing, the first housing 501 is pressed against the outer surface 518 of the vessel's wall and the first housing seals against the outer surface 518 by compressing O-rings 506 that are held in grooves 505 located on the bottom surface 519 of the first housing. The switch 503 is located within a hollow interior core 513 of the lower housing 508. Wires 516 connect to the switch terminals 514 and pass through the lower housing 515 and are connected to the I/O of the microprocessor as shown in FIG. 2. The pressure switch provides an alternative fail safe to allow the microprocessor to stop processes if the pressure exceeds or is less than preselected limits. The limits selected by the stiffness of the domes and modulus of the encapsulant as already discussed.

Figure 6:
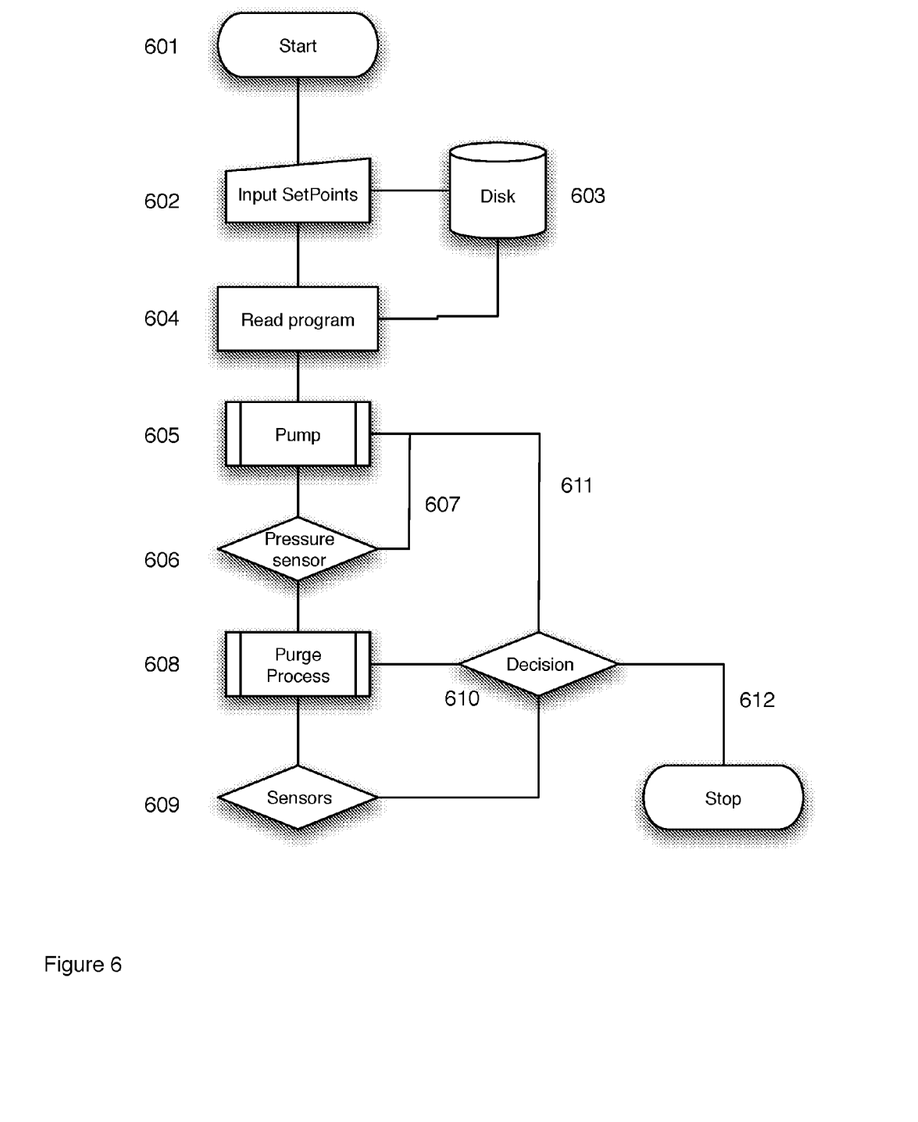
FIG. 6 is a flow chart for an automated method of purging.

Another embodiment shown in FIG. 6 includes a method of using the portable purge system. The process is begun 601 by connecting power to the microprocessor and the automated valves and sensors. The user also connects the purge device to the vessel to be purged using the fittings already discussed. The user then inputs set points for the purge process. Non-limiting exemplary set points include the target composition of atmosphere within the vessel, high pressure limits and low pressure limits for the pressure within the vessel during the purging process, target temperature and temperature limits if a heater or cooler is included to heat or cool the vessel during the purge process. In a preferred embodiment the composition is the water vapor content of the atmosphere within the vessel. The water vapor content may be expressed as either a concentration of water vapor or as a dew point target for operation of the vessel without condensation. The set points may also include process and timing parameters such as a certain number of pump and refill cycles of the vessel to be done and a hold time for purging to ensure stabilization of the interior of the vessel to account for outgassing of components within the vessel. In another embodiment the program for all of the set points have been entered previously and the user instructs the microprocessor to read the parameters from storage. In another embodiment the set points are input 602 and then stored on disk 603 for future recall to repeat the same purge process at a later time. The microprocessor then initiates the purge cycle 605-612. The purge cycle shown is but one of a myriad of possible programmed purge cycles that may be accomplished. The example process begins with pumping 605 on the vessel while continuously reading the state of the pressure switch 606 (discussed in FIG. 5) to ensure a lower limit for pressure within the vessel is not exceeded. The lower limit may be set on the basis of the operating limits of the vessel or on the basis of the items held within the vessel. The vessel might contain electrical or mechanical components sensitive to pressure or even living organisms also sensitive to high and low pressure limits. The process continues 607 pumping until pre-selected limits of pressure or time for pumping are reached. A purge process 608 is then initiated that includes opening valves to allow preconditioned air into the vessel or to introduce chemicals in known quantities into the vessel. The purge process is checked 610 against the set points or program, 602 or 604, selected and may continue to repeat the pump process 611 through another cycle or continue to read sensors 609. Again a decision is made as to whether set points have been attained through sensor reading, time of process or both and if completed the process is stopped 612. The stop would signal to the user the completion of the process and instruct the user the vessel is ready for use. In another embodiment the sensors 609 indicate a failure of the process. The decision 610 may be then to immediately end the process and warn the user of a process failure. A process failure may include over or under pressure of the vessel, perhaps indicative of a leak in the vessel, or failure of a sensor, valve, pump or the microprocessor itself.

In another embodiment, not shown, a fluid fill attachment is included that includes a fluid trap between the pump and the vessel and valves to a fluid supply that are attached to the purge port such that the vessel may be evacuated and then filled with a fluid. In a preferred embodiment the vessel is evacuated and filled with pressure compensating oil for use of the vessel in high-pressure situations such as at ocean depths.

SUMMARY

A purge system and methods are described. The system allows purging of closed vessels in a precise and reproducible manner under microprocessor and sensor control. The process includes automated valves that allow repeated purge cycles with little or no operator attention. The purge parameters may be stored in memory for recall at a later time to repeat the purge process on the same or a different vessel. In a preferred embodiment the equipment and process allows for purging and desiccation of deep-sea vehicles without the need to carry compressed gas cylinders out to sea.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:
1. A purge system for a sealed vessel said purge system comprising:
 a) a vacuum pump connected to the vessel through a purge port,
 b) a first valve located between the vacuum pump and the purge port,
 c) an inlet port connected to a second valve that is connected to the purge port, and connected to a desiccating column,
 d) a vacuum gauge that indicates pressure within the sealed vessel,
 e) a power supply for the vacuum pump,
 f) an exhaust fitting including a pressure relief valve thereby providing a pressure limited source of compressed air to the purge port.
2. The purge system of claim 1 wherein the vacuum pump, first valve, inlet port, second valve vacuum gauge, power supply, pressure relief valve and exhaust fitting are all encased in a weatherproof case.
3. The purge system of claim 1 wherein the second valve is a three-way valve and a compressed gas cylinder is connected to one of the ports on the second valve.
4. The purge system of claim 1 further including a battery attached to the power supply.
5. The purge system of claim 1 wherein the desiccation column is transparent and includes indicating desiccant.
6. a purge system for a sealed vessel said purge system comprising:
 a) a vacuum pump connected to the vessel through a purge port, b) a microprocessor including a user interface an output display and an input/output port,
c) an electrically controlled first valve located between the vacuum pump and the purge port said first valve connected to the input/output port of the microprocessor,
d) an inlet port connected to a second electrically controlled valve that is connected to the purge port, said second electrically controlled valve connected to the input/output port of the microprocessor,
e) a desiccating column connected to the inlet port,
f) a sensor connected to the microprocessor, said sensor measures a parameter of the atmosphere within the vessel by sampling air as it is withdrawn from the vessel, and,
g) a power supply,
h) wherein the microprocessor is connected to, and programmatically controls, the operation of the pump, the first valve, and the second valve based upon measurement data received by the microprocessor from the sensor, to introduce a pre-selected atmosphere into the sealed vessel.

7. The purge system of claim 6 wherein the sensor is at least one selected from a dew point or moisture sensor.

8. The purge system of claim 6 wherein the sensor is a pressure sensor.

9. The purge system of claim 6 wherein the sensor is an oxygen sensor.

10. The purge system of claim 6 wherein the sensor is a flammable gas sensor.

11. The purge system of claim 6 further including an exhaust fitting that provides a pressure limited source of compressed air.

12. The purge system of claim 6 wherein the vacuum pump, first valve, inlet port, second valve vacuum gauge, power supply, pressure relief valve and exhaust fitting are all encased in a weatherproof case.

13. The purge system of claim 6 wherein the second valve is a three-way valve and a compressed gas cylinder is connected to one of the ports on the second valve.

* * * * *